United States Patent
Oguma et al.

(10) Patent No.: US 6,756,131 B2
(45) Date of Patent: Jun. 29, 2004

(54) HIGH TEMPERATURE CORROSION RESISTANT ALLOY, THERMAL BARRIER COATING MATERIAL, AND GAS TURBINE USING HIGH TEMPERATURE CORROSION RESISTANT ALLOY

(75) Inventors: Hidetaka Oguma, Takasago (JP); Ikuo Okada, Takasago (JP); Taiji Torigoe, Takasago (JP); Kouji Takahashi, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 48 days.

(21) Appl. No.: 10/316,070

(22) Filed: Dec. 11, 2002

(65) Prior Publication Data

US 2003/0148140 A1 Aug. 7, 2003

(30) Foreign Application Priority Data

Dec. 17, 2001 (JP) .......................... 2001-383689

(51) Int. Cl.[7] .......................... F03B 3/12; B32B 15/04; C22C 19/05
(52) U.S. Cl. .................. 428/632; 428/680; 428/697; 428/699; 428/701; 428/702; 428/621; 420/442; 420/445; 420/447; 420/455; 420/460; 420/588; 416/241 R
(58) Field of Search .............. 428/469, 472.2, 428/446, 697, 699, 701, 702, 621, 629, 632, 633, 650, 678, 679, 680, 655, 656; 416/241 R; 420/445, 447, 433, 460, 588, 442, 456; 106/287.17, 287.18, 287.19, 286.3, 286.4, 286.5

(56) References Cited

U.S. PATENT DOCUMENTS

| | | | |
|---|---|---|---|
| 5,080,934 A | * | 1/1992 | Naik et al. |
| 5,316,866 A | * | 5/1994 | Goldman et al. |
| 5,939,204 A | | 8/1999 | Czech |

FOREIGN PATENT DOCUMENTS

| | | |
|---|---|---|
| EP | 0 412 397 | 2/1991 |
| WO | WO 96/12049 | 4/1996 |
| WO | WO 99/02745 | 1/1999 |
| WO | WO 99/23265 | 5/1999 |
| WO | WO 01/72455 | 10/2001 |

* cited by examiner

*Primary Examiner*—Jennifer McNeil
(74) *Attorney, Agent, or Firm*—Oblon, Spivak, McClelland, Maier & Neustadt, P.C.

(57) ABSTRACT

A high temperature corrosion resistant alloy composition comprising, in addition to Ni, 0.1 to 12% by weight of Co, 10 to 30% by weight of Cr, 4 to 15% by weight of Al, 0.1 to 5% by weight of Y, and 0.5 to 10% by weight of Re. The high temperature corrosion resistant alloy composition has an excellent oxidation resistance and ductility and is suitable for use in a bonding layer of a thermal barrier coating material.

10 Claims, 5 Drawing Sheets

HIGH TEMPERATURE CORROSION RESISTANT ALLOY, THERMAL BARRIER COATING MATERIAL, AND GAS TURBINE USING HIGH TEMPERATURE CORROSION RESISTANT ALLOY

BACKGROUND OF THE INVENTION

1. Field of the Invention

The present invention relates to a high temperature corrosion resistant alloy, and a thermal barrier coating material, a turbine member, and a gas turbine using the high temperature corrosion resistant alloy. In particular, the present invention relates to a composition of a high temperature corrosion resistant alloy having an excellent oxidation resistance and ductility which is suitable for use in a metal bonding layer of a thermal barrier coating material.

2. Description of Related Art

Figure 7:
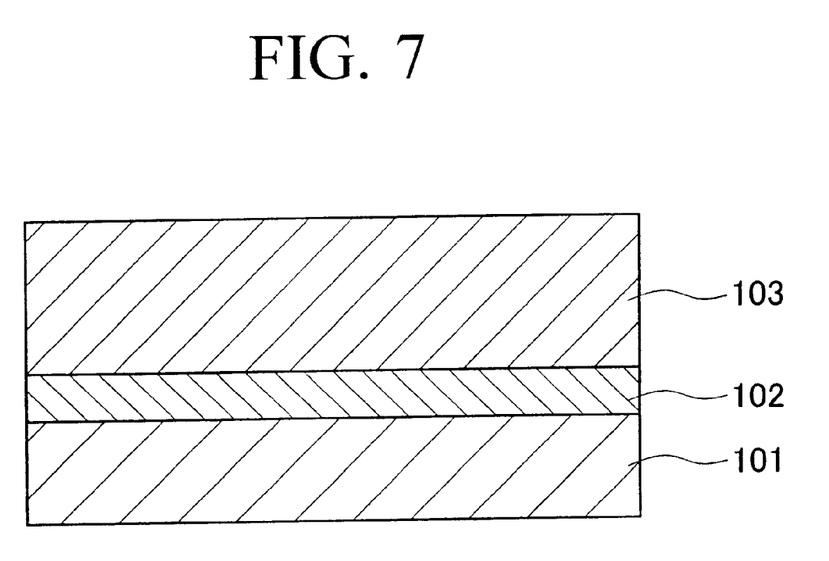
FIG. 7 is a schematic diagram showing a cross-sectional view of the structure of a conventional thermal barrier coating material.

Recently, as one of the energy saving countermeasures, improvements in thermal efficiency in thermal power generation has been studied. In order to improve the power generation efficiency of a gas turbine used for generating power, it is effective to increase a gas inlet temperature of a turbine, and the inlet temperature is often increased to 1,500° C. In order to realize such a high temperature of a power generation device, it is necessary to use a heat resisting material for a stationary vane and a rotor vane of a gas turbine, or for a wall of a combustor. However, even if a turbine vane is made using a heat resisting metal, it cannot withstand such a high temperature by itself. Accordingly, as shown in FIG. 7, it is generally carried out that a metal bonding layer 102 is formed on a base material 101 made of a heat resisting metal, and a ceramic layer 103 made of an oxide ceramics is laminated on the metal bonding layer 102 using a film forming method, such as thermal spraying, to form a thermal barrier coating (TBC) in order to be protected from a high temperature. As a metal bonding layer 102, a MCrAlY alloy (where M is Co, Ni, or a combination thereof) is known, and as a ceramic layer 103, a $ZrO_2$ type material, especially, a yttria stabilized zirconia (YSZ), which is a $ZrO_2$ partially stabilized or completely stabilized by $Y_2O_3$, is often used due to its relatively low thermal conductivity and relatively high thermal expansion rate.

It is possible to improve the heat resistance of a base material using the thermal barrier coating mentioned above. However, due to the use of a high temperature in a gas turbine in these days, it is expected that the inlet temperature of the turbine exceeds 1,500° C. depending on a kind of the gas turbine, and the inlet temperature of a recently developed ultra high temperature gas turbine, which is developed as one of the environmental countermeasures, may reach 1,700° C. Also, it is considered that the temperature at the surface of the thermal barrier coating of a turbine vane reaches about 1,300° C. Accordingly, thermal stress due to difference in linear expansion coefficient of a high temperature part, such as a turbine vane, becomes large since the difference in temperature of a heat cycle associated with the actuation of the turbine becomes large. For this reason, cracks may be generated in the metal bonding layer 102 during the operation of the turbine, and there is a danger that the cracks reach the base material 101 or the ceramic layer 103 may be separated from the bonding layer 102.

Accordingly, it is required to improve the ductility of the metal bonding layer 102 in order to prevent the generation of cracks in the metal bonding layer 102. Also, it is required to improve the corrosion resistance and oxidation resistance of the metal bonding layer 102 since it is expected that the corrosion or the oxidation of a turbine vane, etc., will significantly increase along with increases in the gas temperature due to corrosive components contained in the fuel or salinity of the air flow.

SUMMARY OF THE INVENTION

The present invention takes into consideration the above-mentioned circumstances, and has as an object of providing a high temperature corrosion resistant alloy having excellent oxidation and corrosion resistance, and ductility Also, another object of the present invention is to provide a thermal barrier coating material with excellent exfoliation resistance including a metal bonding layer which is formed by the above-mentioned alloy.

Moreover, yet another object of the present invention is to provide a turbine member which is coated with the above-mentioned thermal barrier coating, and to provide a gas turbine including the turbine member.

The inventors of the present invention, in order to achieve the above objects, have carried out diligent studies on the composition of a MCrAlY alloy which forms a metal bonding layer, and have found that a metal bonding layer having excellent ductility and oxidation resistance can be formed by using a high temperature corrosion resistant alloy having the following composition, and completed the present invention.

That is, the high temperature corrosion resistant alloy according to an embodiment of the present invention includes 0.1–12% by weight of Co, 10–30% by weight of Cr, 4–15% by weight of Al, 0.1–5% by weight of Y, and 0.5–10% by weight of Re, and the rest is substantially formed by Ni.

A thermal barrier coating material including a metal bonding layer having excellent ductility and oxidation resistance may be made by forming the metal bonding layer on a base material using a high temperature corrosion resistant alloy having the above composition, and laminating a ceramic layer on the metal bonding layer. That is, stress applied to the ceramic layer laminated on the metal bonding layer can be reduced by the excellent ductility of the metal bonding layer, and hence, it becomes possible to prevent the ceramic layer from being separated from the metal bonding layer. Also, it becomes possible to prevent oxidation and corrosion of the base material at high temperatures due to the excellent oxidation resistance of the metal bonding layer, and a long-life thermal barrier coating material can be realized. Moreover, the metal bonding layer formed by using the high temperature corrosion resistant alloy having the above-mentioned composition has excellent affinity with stabilized zirconia which is often used for a ceramic layer, and hence, the ceramic layer may be firmly bonded so that it does not readily separate from the metal bonding layer.

Hereinafter, the function and appropriate weight range of each element contained in the high temperature corrosion resistant alloy according to an embodiment of the present invention will be explained.

Co (0.1–12% by weight):

The greater the amount of Co added, the more it increases the ductility of the high temperature corrosion resistant alloy. If the amount of Co is less than 0.1% by weight, a sufficient effect cannot be obtained. If the amount of Co is increased to exceed 12% by weight, the effect obtained will not change.

Cr (10–30% by weight):

The greater the amount of Cr added, the more it increases the oxidation resistance of the high temperature corrosion resistant alloy. If the amount of Cr is less than 10% by weight, a sufficient oxidation resistance cannot be obtained. However, if the amount of Cr is increased to exceed 30% by weight, the hardness of the resultant alloy is increased, and the ductility thereof is decreased. In addition to that, dense formation of $Al_2O_3$ is inhibited. Accordingly, it is more preferable that the added amount of Cr be in the range of 15–25% by weight from the viewpoint of a balance between the oxidation resistance and the ductility.

Al (4–15% by weight):

When the high temperature corrosion resistant alloy is used for the metal bonding layer of the thermal barrier coating, Al has the effects of densely forming $Al_2O_3$ on the surface thereof to improve the oxidation resistance of the metal bonding layer, and improving the oxidation resistance of the thermal barrier coating, for instance. If the amount of Al is less than 4% by weight, dense formation of $Al_2O_3$ will not be occur due to the generation of $(Ni, Co)(Cr, Al)_2O_4$ spinel composite oxide, and the effect of improving the oxidation resistance cannot be obtained. Also, if the amount of Al is increased to exceed 15% by weight, an intermetallic compound (Ni, Co—Al) phase formed by the interaction of Al with Ni and Co, which are contained in the high temperature corrosion resistant alloy, is produced increasing the hardness and decreasing the ductility of the alloy, and hence, this is not preferable. It is more preferable that the amount of Al added be in the range of 4–8% by weight since a high temperature corrosion resistant alloy having better ductility can be produced.

Y (0.1–5% by weight):

Addition of Y prevents the separation of $Al_2O_3$ scales from the surface of the metal bonding layer. However, if the amount of Y is too large, it makes the high temperature corrosion resistant alloy brittle, and decreases the thermal shock resistance. Accordingly, the upper limit of the addition is defined to be 5% by weight. Also, if the amount of Y is less than 0.1% by weight, a sufficient effect will not be obtained. It is more preferable that the amount of Y added be in the range of 0.1–1% by weight.

Re (0.5–6% by weight):

Re has an effect of increasing the density of the above-mentioned $Al_2O_3$ scales formed on the surface of the metal bonding layer, which is made using the high temperature corrosion resistant alloy, to improve the corrosion resistance of the high temperature corrosion resistant alloy. Also, Re has an effect of forming a CrRe compound in an oxidation denatured layer, which is formed directly below the $Al_2O_3$ scales, to prevent brittleness of the oxidation denatured layer, and to inhibit the growth of the $Al_2O_3$ scales so that the life of the thermal barrier coating film can be prolonged.

The above-mentioned oxidation denatured layer is formed along with a decrease in the concentration of Al in the vicinity of the metal bonding layer surface and a relative increase in the concentration of Cr and Ni. In such a Cr and Ni rich state, compounds such as $NiCr_2O_4$, and $Cr_2O_3$ which are of low density and brittle, tend to occur in the oxidation denatured layer. However, if the metal bonding layer is formed using the high temperature corrosion resistant alloy according to the embodiments of the present invention, since the Cr concentration of the above oxidation denatured layer is lowered, it becomes possible to prevent the above-mentioned low density compounds from being produced. Accordingly, it also becomes possible to prevent the thermal shock resistance of the metal bonding layer from being lowered.

If the content of Re is less than 0.5% by weight, the above effect cannot be obtained since there is almost no formation of the CrRe compounds explained above. Also, if the amount of Re is increased exceeding 10% by weight, the resulting product is hardened and the ductility thereof is decreased.

In the high temperature corrosion resistant alloy according to an embodiment of the present invention, it is preferable, in particular, that the content of Re be in the range of 0.5–6% by weight, and it is more preferable that the content of Re be in the range of 0.5–4% by weight. If the content of Re is controlled to be in the above range, it becomes possible to obtain a long-life metal bonding layer having excellent ductility in which the growth of $Al_2O_3$ scales is slow and do not readily separated from the surface of the metal bonding layer.

The high temperature corrosion resistant alloy according to an embodiment of the present invention may also include 0.01–0.7% by weigh of Hf and/or 0.01–1.5% by weight of Si.

Hf (0.01–0.7% by weight):

Similar to the above-mentioned Y, Hf has an effect of preventing the separation of $Al_2O_3$ scales from the surface of the metal bonding layer. In this manner, Hf prevents the separation of the ceramic layer, which is laminated on the metal bonding layer, to prolong the life of the thermal barrier coating material. However, if the amount of Hf added is too large, it makes the high temperature corrosion resistant alloy brittle. Accordingly, it is preferable that the upper limit of Hf be 0.7% by weight.

Si (0.01–1.5% by weight):

Si prevents the growth of $Al_2O_3$ on the surface of the metal bonding layer, and has an effect of prolonging the life of the metal bonding layer. If the amount of Si added is less than 0.01% by weight, the above effect cannot be obtained. Also, if Si is added to exceed 1.5% by weight, the high temperature corrosion resistant alloy is hardened, and the ductility thereof tends to be lowered.

The thermal barrier coating material according to an embodiment of the present invention includes a heat-resistant alloy base material; a metal bonding layer disposed on the heat-resistant alloy base material, the metal bonding layer being formed of any one of the above-mentioned high temperature corrosion resistant alloy composition, and a ceramic layer disposed on the metal bonding layer.

The thermal barrier coating material according to an embodiment of the present invention, since it includes the metal bonding layer formed by using any one of the above-mentioned high temperature corrosion resistant alloy compositions, has excellent oxidation resistance, corrosion resistance, and ductility. Accordingly, if applied to a high temperature part, it becomes possible to effectively prevent oxidation and corrosion of the part due to high temperatures, and to impart high durability to the part by preventing the generation of cracks in the metal bonding layer associated with heat cycles. Also, since the metal bonding layer formed by the high temperature corrosion resistant alloy composition according to an embodiment of the present invention has excellent affinity to not only the heat-resistant alloy which forms the base material but also the ceramic material which forms a ceramic layer, such as stabilized zirconia, it becomes possible to more firmly fix the ceramic layer, which is a thermal barrier layer, and in this point also, a thermal barrier coating material in which separation of the ceramic layer does not readily occur may be realized.

In accordance with another aspect of the present invention, in the above thermal barrier coating material, an oxidation scale layer including $Al_2O_3$ as its main constituent is formed in the metal bonding layer at the boundary between the metal bonding layer and the ceramic layer, and an oxidation denatured layer is formed in the metal bonding layer at a position below the oxidation scale layer. The content of Al of the oxidation denatured layer is lowered due to the formation of the oxidation scale layer, and the oxidation denatured layer contains precipitates including CrRe compounds its main constituent.

That is, the metal bonding layer of the thermal barrier coating material according to an embodiment of the present invention is formed by the high temperature corrosion resistant alloy composition so that dense $Al_2O_3$ scales are formed on the surface of the metal bonding layer, and so that precipitates containing CrRe compounds are produced in an oxidation denatured layer, which is generated due to the formation of the $Al_2O_3$ scales, in order to prevent the generation of low density brittle compounds, such as $NiCr_2O_4$, and $Cr_2O_3$, to realize a thermal barrier coating material having excellent oxidation and corrosion resistance. Also, since the growth of $Al_2O_3$ is inhibited due to the formation of the above CrRe compounds, it becomes possible to maintain an appropriate thickness of the $Al_2O_3$ scales for a long period of time. Accordingly, it becomes possible to provide a long-life thermal barrier coating material according to an embodiment of the present invention in the above-mentioned manner.

In yet another aspect of the present invention, in the above thermal barrier coating material, the metal bonding layer may be made into a film by a method comprising a step of thermal spraying a powder of any one of the above high temperature corrosion resistant alloy compositions, by a method comprising a step of depositing any one of the above high temperature corrosion resistant alloy compositions using an electron beam physical deposition method.

The present invention also provides a turbine member including any one of the thermal barrier coating materials. That is, a long-life turbine member having excellent oxidation and corrosion resistance in which separation of the ceramic layer does not readily occur may be provided by using the above thermal barrier coating material.

The present invention also provides a gas turbine including the above turbine member. The gas turbine which is formed by using the turbine member having excellent oxidation and corrosion resistance according to an embodiment of the present invention may be stably operated for a long period of time with high efficiency even when a gas at a high temperature is used.

BRIEF DESCRIPTION OF THE DRAWINGS

Some of the features and advantages of the invention have been described, and others will become apparent from the detailed description which follows and from the accompanying drawings, in which.

DETAILED DESCRIPTION OF THE INVENTION

The invention summarized above and defined by the enumerated claims may be better understood by referring to the following detailed description, which should be read with reference to the accompanying drawings. This detailed description of particular preferred embodiments, set out below to enable one to build and use particular implementations of the invention, is not intended to limit the enumerated claims, but to serve as particular examples thereof.

Figure 1:
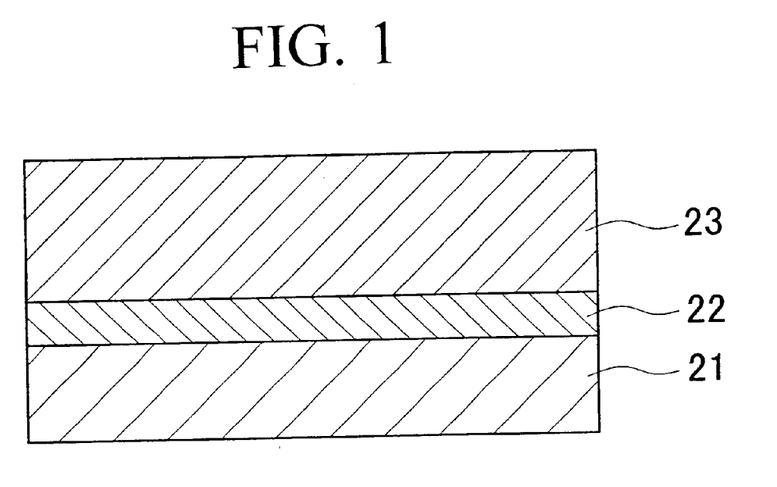
FIG. 1 is a schematic diagram showing a cross-sectional view of the structure of a thermal barrier coating material according to an embodiment of the present invention.

FIG. 1 is a schematic diagram showing a cross-sectional view of the structure of a thermal barrier coating film to which the thermal barrier coating material according to an embodiment of the present invention is applied. The thermal barrier coating film includes a bond coat layer (a metal bonding layer) 22, which is laminated on a high temperature heat-resistant alloy base material 21 for, for instance, a rotor vane, and a ceramic layer 23, which is laminated on the bond coat layer 22. The bond coat layer 22 is made into a film using a high temperature corrosion resistant alloy according to an embodiment of the present invention having excellent corrosion resistance and oxidation resistance. Also, the ceramic layer 23 is formed by using a ceramics material, such as $ZrO_2$ partially stabilized by $Y_2O_3$ (yttria partially stabilized zirconium, YSZ).

The bond coat layer 22 decreases the difference in the thermal expansion coefficient between the base material 21 and the ceramic layer 23 to relieve the thermal stress, and prevents the ceramic layer 23 from being separated from the bond coat layer 22. Also, the bond coat layer 22 prevents the oxidation and corrosion of the base material 21.

The bond coat layer 22 may be formed using, for instance, a low pressure plasma thermal spraying method, a high velocity flame spraying method, and an electron beam physical vapor deposition method.

The bond coat layer 22 used for the thermal barrier coating film shown in FIG. 1 is characterized by the fact that it is formed by using the high temperature corrosion resistant alloy according to an embodiment of the present invention, and any one of the above-mentioned spraying and deposition methods. That is, a bond coat layer having excellent oxidation resistance, corrosion resistance, and ductility is realized by using the high temperature corrosion resistant alloy including 0.1–12% by weight of Co, 10–30% by weight of Cr, 4–15% by weight of Al, 0.1–5% by weight of Y, and 0.5–10% by weight of Re, and the rest of the alloy is substantially formed by Ni.

The above-mentioned bond coat layer 22 can be made into a film by using a powder of the high temperature corrosion resistant alloy having the above-mentioned range of composition, and thermal spraying or depositing it on the base material 21. In particular, if the film is made using the low pressure plasma thermal spraying method, it becomes possible to form a more dense bond coat layer 22. Accordingly, a thermal barrier coating film having excellent oxidation resistance and corrosion resistance can be produced.

Also, it is possible to add, in addition to the above-mentioned composition, 0.01–0.7% by weight of Hf, and/or 0.01–1.5% by weight of Si to a high temperature corrosion resistant alloy material which forms the bond coat layer 22. In this manner, a long life bond coat layer 22 which does not readily separate may be realized.

The ceramic layer 23 may be formed by using, other than the above-mentioned YSZ, $ZrO_2$ which is partially stabilized or completely stabilized by $Er_2O_3$, $Yb_2O_3$, $Sc_2O_3$, and so forth. Also, examples of the ceramics materials other than $ZrO_2$ include $Al_2O_3$, and $La_2Zr_2O_7$. Since the bond coat layer 22 having the above configuration has excellent affinity to any of the ceramics materials, the bond coat layer 22 and the ceramic layer 23 are firmly bonded and have excellent thermal shock resistance.

For instance, when $ZrO_2$ stabilized by $Yb_2O_3$ is used as a material for forming the ceramic layer 23, the ceramic layer 23 may be made as a film using a $ZrO_2$—$Yb_2O_3$ powder or ingots by the atmospheric pressure plasma thermal spraying method or the electron beam physical vapor deposition method. The $ZrO_2$—$Yb_2O_3$ powder used in the atmospheric pressure plasma thermal spraying may be prepared by the following procedures.

First, a powder of $ZrO_2$ and a predetermined amount of $Yb_2O_3$ powder are prepared, and these are mixed in a ball mill together with an appropriate binder, dispersant, etc., to form a slurry. Then, after the slurry is granulated and dried using a spray drier, the granules are subjected to a diffusion heat treatment to form a solid solution, and composite power of $ZrO_2$—$Yb_2O_3$ is obtained.

By thermal spraying the composite powder obtained onto the bond coat layer 22, the ceramic layer 23 including $Yb_2O_3$ stabilized $ZrO_2$ is formed. Also, if an electron beam physical deposition method is used instead of the thermal spraying method as a film making method for the ceramic layer 23, an ingot may be used for that purpose, which is obtained by sintering or electro-melting and solidifying a raw material having a predetermined composition.

The thermal barrier coating material having the above-mentioned configuration is useful for application to rotor vanes and stationary vanes of industrial turbines, or to internal cylinders and tail cylinders of combustors. Also, the application of the above thermal barrier coating material is not limited to industrial gas turbines, and may be applied to high temperature parts (i.e., parts whose temperature may become high) of vehicle engines or jet planes. By applying the thermal barrier coating film of the present invention to the above-mentioned parts, it becomes possible to construct a gas turbine member or a high temperature part having excellent heat cycle durability.

Figure 4:
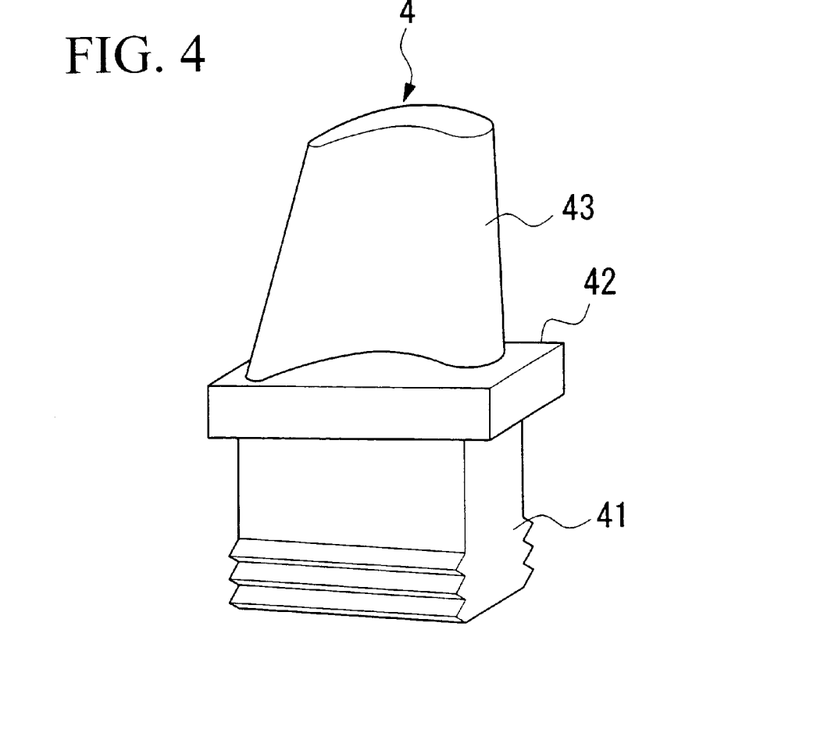
FIG. 4 is a diagram showing a perspective structural view of a rotor vane, which is an example of the turbine member according to an embodiment of the present invention.
Figure 5:
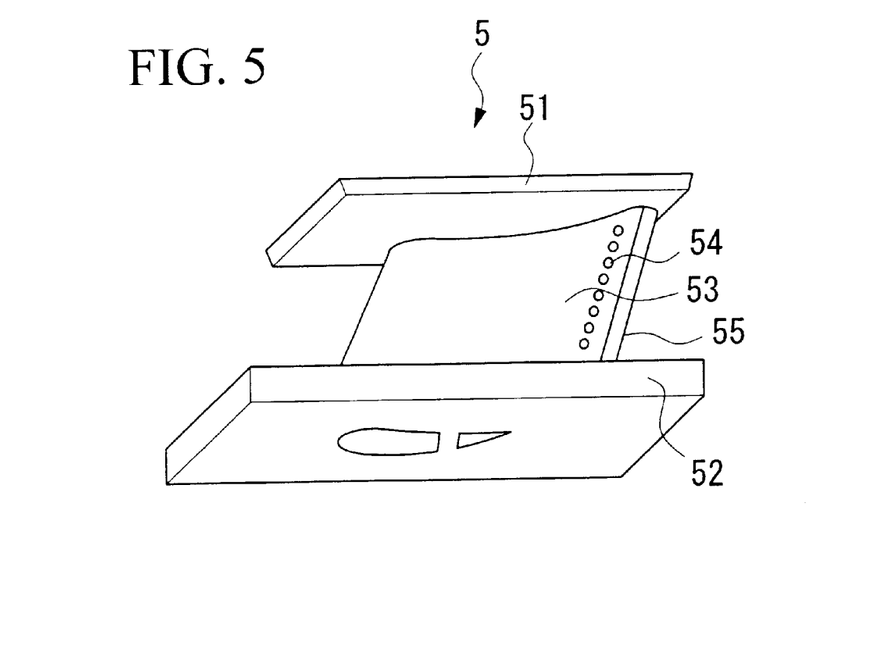
FIG. 5 is a diagram showing a perspective structural view of a stationary vane, which is an example of the turbine member according to an embodiment of the present invention.

FIGS. 4 and 5, respectively, are diagrams showing a perspective view of an example of the structure of a turbine vane (a turbine member) to which the above-mentioned thermal barrier coating film according to an embodiment of the present invention may be applied.

The gas turbine rotor vane 4 shown in FIG. 4 includes a tab tail 41 which is fixed to a disc side, a platform 42, and a vane part 43. Also, the gas turbine stationary vane 5 shown in FIG. 5 includes an inner shroud 51, an outer shroud 52, and a vane part 53. The vane part 53 includes sealing fin cooling holes 54, a slit 55, and so forth.

Figure 6:
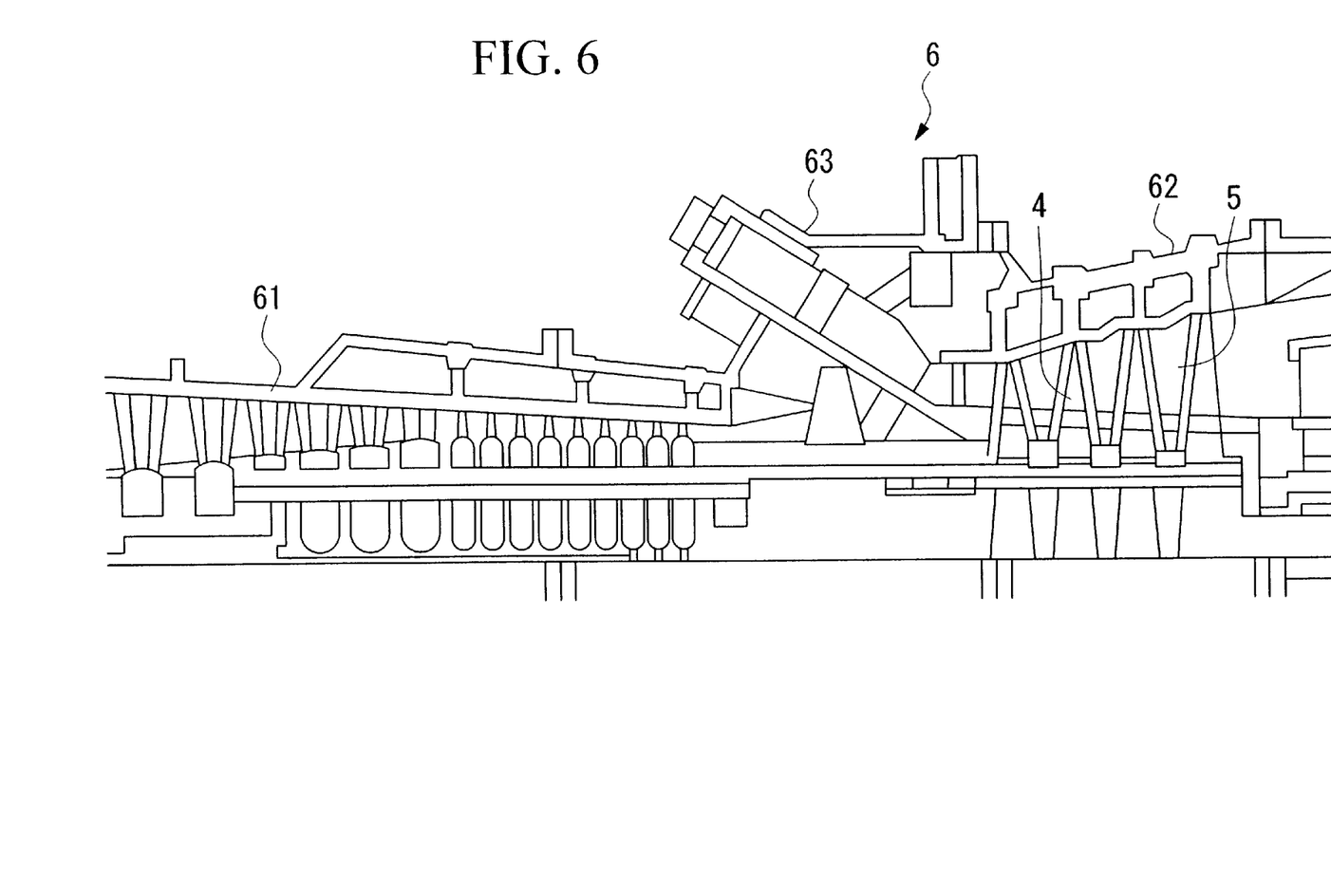
FIG. 6 is a schematic diagram showing a partial cross-sectional view of a gas turbine according to an embodiment of the present invention.

Next, a gas turbine to which the turbine vanes 4 and 5 shown in FIGS. 4 and 5, respectively, may be applied will be explained with reference to FIG. 6. FIG. 6 is a schematic diagram showing a partial cross-sectional view of a gas turbine according to an embodiment of the present invention.

The gas turbine 6 includes a compressor 61 and a turbine 62 directly connected to the compressor 61. The compressor 61 may be constructed as an axial compressor, for example, and increases the pressure of atmospheric air or of a predetermined gas which is drawn as working fluid via an inlet thereof. A combustor 63 is connected to an outlet of the compressor 61, and the working fluid discharged from the compressor is heated to a predetermined turbine inlet temperature by the combustor 63. The working fluid whose temperature is increased to the predetermined temperature is supplied to the turbine 62. As shown in FIG. 6, a plurality of gas turbine stationary vanes 5 mentioned above are disposed in a casing of the turbine 62. Also, the above-mentioned gas turbine rotor vane 4 is attached to a main shaft 64 so as to form a pair with a corresponding stationary vane 5. One end of the main shaft 64 is connected to a rotary shaft 65 of the compressor 61, and the other end of the main shaft 64 is connected to a rotary shaft of a power generator which is not shown in the figure.

According to the above configuration, when a high temperature, high pressure working fluid is supplied to the inside of the casing of the turbine 62 from the combustor 63, the main shaft 64 is rotated due to the expansion of the working fluid in the casing to actuate the power generator (not shown in the figure) which is connected to the gas turbine 6. That is, the kinetic energy generated by lowering the pressure by each of the stationary vanes 5 fixed to the casing is converted into a rotary torque via each of the rotor vanes 4 attached to the main shaft 65. The rotary torque generated in this manner is transmitted to the main shaft 64 to actuate the power generator.

In general, a material used for a gas turbine rotor vane is a heat-resistant alloy (for instance, a commercially available alloy material CM247L, a product of Canon maskegon Inc.), and a material used for a gas turbine stationary vane is also a heat-resistant alloy (for instance, a commercially available alloy material IN939, a product of Inco Co.). That is, a heat-resistant alloy, which may be used as the base material for the thermal barrier coating material according an embodiment of the present invention, is generally used. Accordingly, if the thermal barrier coating film according to an embodiment of the present invention is applied to the above turbine vane, a turbine vane having an excellent thermal barrier effect and separation resistance may be obtained. Accordingly, it becomes possible to realize a long-life turbine vane having excellent durability which may be used under higher temperature environments. Also, the fact that the turbine vane may be applied to the higher temperature environment means that the temperature of the working fluid may be increased, and hence, the gas turbine efficiency can be improved.

According to the above-mentioned embodiment of the present invention, since the metal bonding layer disposed between the ceramic layer and the base material is formed by using the high temperature corrosion resistant alloy composition according to an embodiment of the present invention having excellent oxidation resistance, it becomes possible to obtain a bonding layer having excellent durability, which does not readily separate from the ceramic layer, and oxidation and corrosion thereof is hardly caused even when used under high temperature environment. Accordingly, a thermal barrier coating material having excellent durability, which may be used under higher temperature environment as compared with conventional materials, may be realized.

Also, a member forming a gas turbine or a gas turbine itself having sufficient durability even under higher temperature environment as compared with conventional environment may be obtained by coating it with the thermal barrier coating film according to an embodiment of the present invention.

Embodiments

Hereinafter, the present invention and effects thereof will be explained in detail using the embodiments.

An alloy base material of 5 mm width including Ni, 22% by weight of Cr, 9% by weight of Mo, 8% by weight of Co, and 1.0% by weight of Al, and alloy powder having the composition shown in Table 1 below were prepared, and each sample was obtained by forming an alloy layer of 0.1 mm thickness on the alloy base material using the powder by the low pressure plasma thermal spraying method. Also, besides the simple films indicated as "as coat" in Table 1, heat treatment materials indicated as "heat treat" in Table 1 were prepared by subjecting a film to a heat diffusion treatment at 850° C. for 24 hours after being made into a film.

Then, each of the samples obtained in the above-mentioned manner was cut into a piece of 8 mm×10 mm, and was subjected to the following three-point bending test to evaluate the ductility of an alloy layer 32 of the sample.

Figure 2:
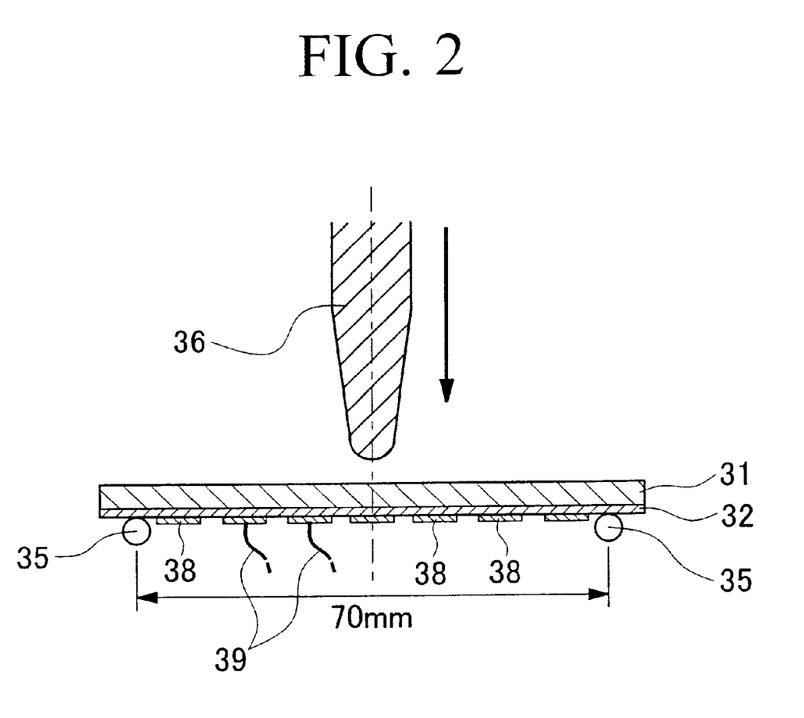
FIG. 2 is a schematic diagram showing the structure of a bending test device used for a three-point bending test.
Figure 3:
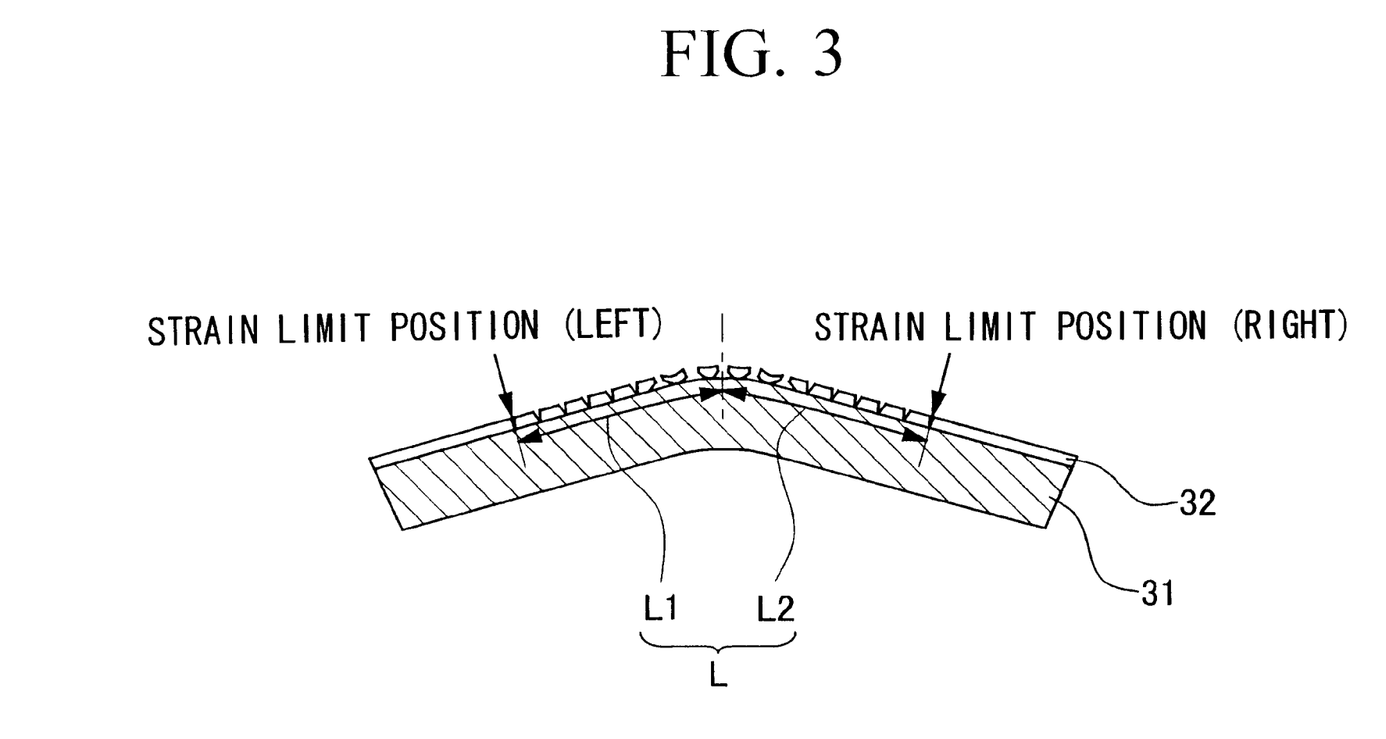
FIG. 3 is a diagram showing a side view of a sample after the bending test using the bending test device shown in FIG. 2.

Here, the three-point bending test will be explained with reference to FIGS. 2 and 3. FIG. 2 is a diagram showing a schematic structural view of a bending test device used for the three-point bending test. FIG. 3 is a diagram showing a side view of a sample after the bending test.

The bending device shown in FIG. 2 includes two supporting pins 35 and 35, and a punch 36. The supporting pins 35 and 35 are disposed parallel to each other in a horizontal direction so as to be separated 70 mm away from each other. The punch 36 is positioned so that the center axis thereof is located above the center of the line connecting the supporting pins 35 and 35. The sample including the alloy layer 32 on the base material 31 is placed on the supporting pins 35 and 35 so that the alloy layer 32 faces the supporting pins 35 and 35. Also, a plurality (seven in FIG. 2) of strain gauges 38 for measuring the strain of the alloy layer 32 due to the bending are attached to the surface of the alloy layer 32 of the sample mounted on the supporting pins 35 and 35, and a signal line 39 for reading an output signal from the strain gauge 38 is connected to each of the strain gauges 38.

When the three-point bending test is carried out using the bending test device having the above-mentioned configuration, the punch 36 is contacted to the base material 31 of the sample mounted on the supporting pins 35 and 35, and then moved in a downward direction in the figure for a predetermined distance to bend the sample in a V shape. At that time, the strain generated on the surface of the alloy layer 32 is measured using the strain gauges 38.

The samples subjected to the test are bent in a V shape as shown in FIG. 3, and a crack is generated in the film thickness direction from the position at which the punch 36 was pressed. In this embodiment, the lengths L1 and L2 were measured, each of which indicates the length of the crack from the center of the sample to the left hand side end (L1), and to the right hand side end (L2) as shown in FIG. 3, and the total of L1 and L2 was calculated to obtain a crack generation region length (L), which is indicated as "crack length" in Table 1 below.

Also, a strain limit value, which indicates the limit at which a crack is generated in the alloy layer 32, is obtained from a strain distribution curve based on the results of the measurements using the above-explained strain gauges 38, and this is indicated as "strain limit" in the following Table 1.

TABLE 1

| Sample | | Powder composition (% by weight) | | | | | | | | | Crack length | Strain |
| | | Ni | Co | Cr | Al | Y | Re | Ta | Hf | Si | L (mm) | limit (%) |
| --- | --- | --- | --- | --- | --- | --- | --- | --- | --- | --- | --- | --- |
| 1A | as coat | bal | 10 | 20 | 6 | 0.3 | 4 | — | — | — | 21.5 | 1.3 |
| 1B | heat treat | | | | | | | | | | 24.7 | 1.0 |
| 2A | as coat | bal | 10 | 17 | 4 | 0.3 | 4 | — | — | — | 19.0 | 1.5 |
| 2B | heat treat | | | | | | | | | | 17.4 | 1.7 |
| 3A | as coat | bal | 10 | 18 | 6 | 0.3 | 5 | — | — | — | 20.4 | 1.4 |
| 3B | heat treat | | | | | | | | | | 17.5 | 1.8 |
| 4A | as coat | bal | 10 | 18 | 6 | 0.3 | 6 | — | — | — | 21.1 | 1.3 |
| 4B | heat treat | | | | | | | | | | 17.6 | 1.7 |
| 5A | as coat | bal | 10 | 18 | 6.5 | 0.3 | 2 | — | 0.5 | 1 | 18.0 | 1.6 |
| 5B | heat treat | | | | | | | | | | 17.2 | 1.8 |
| 6A | as coat | bal | 10 | 15 | 5 | 0.3 | 0.3 | — | — | — | 17.7 | 1.7 |
| 6B | heat treat | | | | | | | | | | 17.0 | 1.9 |
| 7A | as coat | bal | 12 | 17 | 4 | 0.3 | 11 | — | — | — | 26.0 | 0.9 |
| 7B | heat treat | | | | | | | | | | 24.9 | 1.0 |
| 8A | as coat | bal | 10 | 18 | 6 | 1 | 2 | — | 0.8 | 1.6 | 22.0 | 1.2 |
| 8B | heat treat | | | | | | | | | | 22.3 | 1.2 |
| 9A | as coat | bal | 10 | 18 | 6.5 | 0.3 | 2 | 6 | 0.5 | 1 | 28.8 | 0.7 |
| 9B | heat treat | | | | | | | | | | 29.0 | 0.7 |
| 10A | as coat | 32 | bal | 21 | 8 | 0.5 | — | — | — | — | 26.8 | 0.85 |
| 10B | heat treat | | | | | | | | | | 18.7 | 1.6 | bal = balance

As shown in Table 1, each of the samples 1A through 5B, whose composition range satisfies the conditions of the present invention, has a shorter crack generation region length L and a larger strain limit value as compared with the samples 9A and 9B whose alloy layer is made using an alloy which is conventionally used as one having an excellent oxidation resistance. Also, when compared with the samples 10A and 10B whose alloy layer is made using an alloy which is conventionally used as one having an excellent ductility, the crack generation region length L of the samples according to the present invention is shorter, and the strain value thereof is almost the same for the heat treatment material and is better for the as coat material.

Accordingly, it was confirmed that the alloy layers which were formed using the high temperature corrosion resistant alloy material satisfying the composition range of the present invention (i.e., 0.1–12% by weight of Co, 10–30% by weight of Cr, 4–15% by weight of Al, 0.1–5% by weight of Y, and 0.5–10% by weight of Re, and the rest is Ni) had excellent ductility. Accordingly, it can be concluded that the generation of cracks may be efficiently prevented during a thermal spraying process or a heat cycle if a high temperature corrosion resistance material which satisfies the conditions of the present invention is used.

In conclusion, as explained above, the high temperature corrosion resistant alloy according to an embodiment of the present invention includes 0.1–12% by weight of Co, 10–30% by weight of Cr, 4–15% by weight of Al, 0.1–5% by weight of Y, and 0.5–10% by weight of Re, and the rest is substantially formed by Ni. If a metal bonding layer of a thermal barrier coating material is formed using the high temperature corrosion resistant alloy, it becomes possible to form a metal bonding layer having excellent ductility. Accordingly it becomes possible to reduce stress applied to a ceramic layer laminated on the metal bonding layer, and hence it becomes possible to prevent separation of the ceramic layer from the metal bonding layer.

The thermal barrier coating material according to an embodiment of the present invention, since it has a metal bonding layer formed by the above-mentioned high temperature corrosion resistant alloy composition of the present invention between a base material and a ceramic layer, has excellent oxidation and corrosion resistance. Also, the ceramic layer of the thermal barrier coating material does not readily separate from the metal bonding layer due to the above-mentioned characteristics thereof.

The gas turbine member according to an embodiment of the present invention has sufficient durability when used in higher temperature environments as compared with conventional turbine members since it is formed by using the above-mentioned thermal coating material. Hence, a gas turbine member having excellent durability is realized by the present invention. Also, gas whose temperature is higher than conventional temperatures may be used for a gas turbine provided with the gas turbine member according to an embodiment of the present invention. Accordingly, the turbine can be operated highly efficiently.

Having thus described example embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. A high temperature corrosion resistant alloy composition, consisting of: 0.1 to 12% by weight of Co, 10 to 30% by weight of Cr, 4 to 15% by weight of Al, 0.1 to 5% by weight of Y, 0.5 to 10% by weight of Re, 0 to 0.7% by weight of Hf, 0 to 1.5% by weight of Si, and the balance Ni.

2. A high temperature corrosion resistant alloy composition as set forth in claim 1, wherein said alloy composition comprises 0.5 to 6% by weight of Re.

3. A high temperature corrosion resistant alloy composition as set forth in claim 2, wherein said alloy composition comprises 0.5 to 4% by weight of Re.

4. A high temperature corrosion resistant alloy composition as set forth in claim 1, wherein said alloy composition comprises 0.01 to 0.7% by weight of Hf and/or 0.01 to 1.5% by weight of Si.

5. A thermal barrier coating material, comprising:
   a heat-resistant alloy base material;
   a metal bonding layer disposed on said heat-resistant alloy base material, said metal bonding layer formed of a high temperature corrosion resistant alloy composition according to claim 1, and
   a ceramic layer disposed on said metal bonding layer.

6. A thermal barrier coating material as set forth in claim 5, further comprising:
   an oxidation scale layer comprising $Al_2O_3$ as its main constituent formed on said metal bonding layer at a boundary between said metal bonding layer and said ceramic layer, and
   an oxidation denatured layer formed on said metal bonding layer at a position below said oxidation scale layer, a content of Al of said oxidation denatured layer being lowered due to the formation of said oxidation scale layer, wherein
   precipitates including CrRe compounds as its main constituent are contained in said oxidation denatured layer.

7. A thermal barrier coating material as set forth in claim 5, wherein
   said metal bonding layer is made into a film by a method comprising a step of thermal spraying a powder of the high temperature corrosion resistant alloy composition.

8. A thermal barrier coating material as set forth in claim 5, wherein
   said metal bonding layer is made into a film by a method comprising a step of depositing of the high temperature corrosion resistant alloy composition using an electron beam physical deposition method.

9. A turbine member comprising: a thermal barrier coating material as set forth in claim 5.

10. A gas turbine comprising: a turbine member as set forth in claim 9.

* * * * *